(12) United States Patent
McGehee et al.

(10) Patent No.: US 12,372,801 B2
(45) Date of Patent: Jul. 29, 2025

(54) PLANAR-OPTICS BASED LIGHT DELIVERY SYSTEM FOR MAGNETO-OPTICAL TRAPS AND METHOD FOR USING THE SAME

(71) Applicants: University of Maryland, College Park, College Park, MD (US); Government of the United States of America, as represented by the Secretary of Commerce, Gaithersburg, MD (US)

(72) Inventors: William R. McGehee, Boulder, CO (US); Jabez McClelland, Bethesda, MD (US); Vladimir Aksyuk, Gaithersburg, MD (US); Wenqi Zhu, Vienna, VA (US); Amit Kumar Agrawal, Rockville, MD (US)

(73) Assignees: University of Maryland, College Park, College Park, MD (US); Government of th United States of America, as represented by the Secretary of Commerce, Gaithersburg, MD (US)

( * ) Notice: Subject to any disclaimer, the term of this patent is extended or adjusted under 35 U.S.C. 154(b) by 580 days.

(21) Appl. No.: 17/831,003

(22) Filed: Jun. 2, 2022

(65) Prior Publication Data
US 2022/0390760 A1 Dec. 8, 2022

Related U.S. Application Data

(60) Provisional application No. 63/196,559, filed on Jun. 3, 2021.

(51) Int. Cl.
G02B 27/42 (2006.01)
G02B 5/18 (2006.01)
G04F 5/14 (2006.01)

(52) U.S. Cl.
CPC ....... G02B 27/4272 (2013.01); G02B 5/1833 (2013.01); G02B 27/4233 (2013.01); *G04F 5/145* (2013.01)

(58) Field of Classification Search
CPC .............. G02B 27/4272; G02B 5/1833; G02B 27/4233; G02B 1/00; G02B 1/002;
(Continued)

(56) References Cited

U.S. PATENT DOCUMENTS

2019/0113727 A1\* 4/2019 Tamma ................... H01L 33/58
2020/0120785 A1\* 4/2020 Eckel ....................... H05H 3/02
(Continued)

FOREIGN PATENT DOCUMENTS

WO WO-2020216625 A1 \* 10/2020 ......... G02B 27/4233

OTHER PUBLICATIONS

Birkl et al., Atom Optics with Microfabricated Optical Elements, Optics Communications, 2001, 191:67-81.
(Continued)

*Primary Examiner* — Arnel C Lavarias
(74) *Attorney, Agent, or Firm* — Quarles & Brady LLP; Yakov S. Sidorin

(57) ABSTRACT

An apparatus for light delivery to magneto-optical trap (MOT) system utilizes only planar optical diffraction devices including a planar-integrated-circuit PIC and a metasurface MS. When MOT is based on the use of a diffraction grating, a grating chip is additionally employed to launch and manipulate light for laser cooling. Bridging the gap between the sub-micrometer-scale guided mode on the PIC and the centimeter-scale beam needed for laser cooling, a magnification of the mode area by about $10^{10}$ is demonstrated using an on-chip extreme-mode-converter to launch a Gaussian mode into free space from a PIC-waveguide and a beam-shaping, polarization-dependent MS to form a
(Continued)

diverging laser beam with a flat-top spatial profile, which efficiently illuminates the grating chip without loss of light. Comparison to equivalent Gaussian-beam-illuminated GMOTs evidences advantageous power efficiency of operation of the proposed light delivery system as compared with conventional systems employing Gaussian distribution of illumination at the grating chip.

20 Claims, 7 Drawing Sheets

(58) Field of Classification Search
CPC ...... G02B 5/18; G02B 5/1814; G02B 5/1819; G02B 5/1861; G02B 27/42; G02B 27/425; G02B 27/44; G04F 5/145
USPC ......... 359/569, 558, 566, 572, 280; 250/251
See application file for complete search history.

(56) References Cited

U.S. PATENT DOCUMENTS

| | | | |
|---|---|---|---|
| 2021/0319925 A1* | 10/2021 | Cheiney | G01P 15/093 |
| 2024/0203616 A1* | 6/2024 | Blumenthal | G21K 1/003 |

OTHER PUBLICATIONS

Bomzon et al., Pancharatnam-Berry Phase in Space-Variant Polarization-State Manipulations with Subwavelength Gratings, Optics Letters, 2001, 26(18):1424-1426.

Eckel et al., Challenges to Miniaturizing Cold Atom Technology for Deployable Vacuum Metrology, Metrologia, 2018, 55:S182-S193.

Elvin et al., A Cold-Atom Clock Based on a Diffractive Optic, arXIV:1909.04361, 2019, pp. 1-6.

Imhof et al., Two-Dimensional Grating Magneto-Optical Trap, Physical Review A, 2017, 96:033636, pp. 1-9.

Keil et al., Fifteen Years of Cold Matter on the Atom Chip: Promise, Realizations, and Prospects, Journal of Modern Optics, 2016, 63(18):1840-1885.

Kim et al., Photonic Waveguide to Free-Space Gaussian Beam Extreme Mode Converter, Light: Science & Applications, 2018, 7:72, pp. 1-13.

McGehee et al., Magneto-Optical Trapping Using Planar Optics, New Journal of Physics, 2021, 23:013021, pp. 1-9.

McGilligan et al., Diffraction Grating Characterisation for Cold-Atom Experiments, arXIV:1601.07431, 2016, pp. 1-8.

McGilligan et al., Grating Chips for Quantum Technologies, Scientific Reports, 2017, 7:384, pp. 1-7.

McGilligan et al., Laser Cooling in a Chip-Scale Platform, Applied Physics Letters, 2020, 117:054001, pp. 1-4.

Rushton et al., Contributed Review: The Feasibility of a Fully Miniaturized Magneto-Optical Trap for Portable Ultracold Quantum Technology, Review of Scientific Instruments, 2014, 85:121501, pp. 1-23.

Yulaev et al., Collimating a Free-Space Gaussian Beam by Means of a Chip-Scale Photonic Extreme Mode Converter, In 2018 International Conference on Optical MEMS and Nanophotonics (OMN), pp. 1-2.

Yulaev et al., Metasurface Integrated Photonic Platform for Versatile Free-Space Beam Projection with Polarization Control, ACS Photonics, 2019, 6:2902-2909.

* cited by examiner

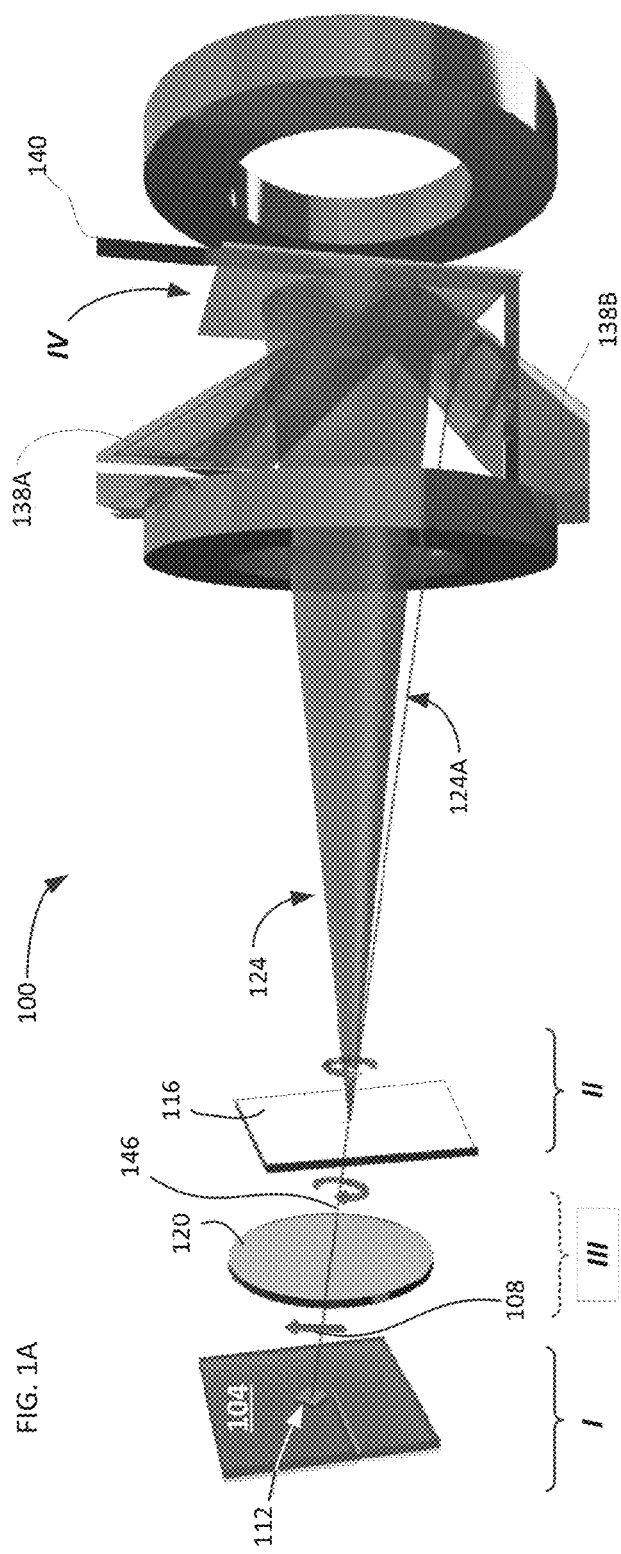
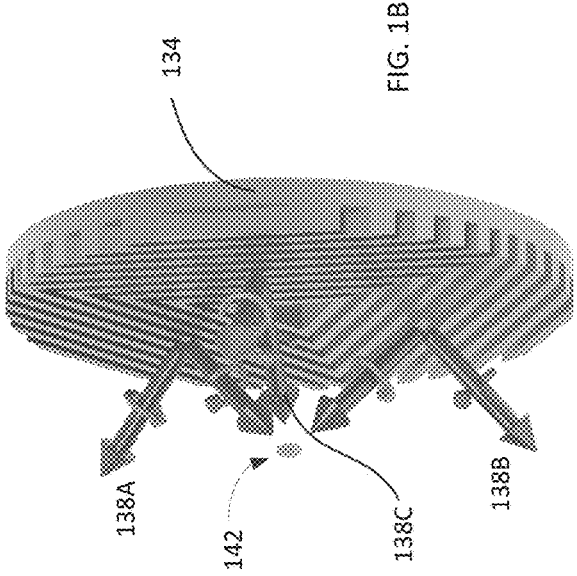
FIG. 1A
FIG. 1B

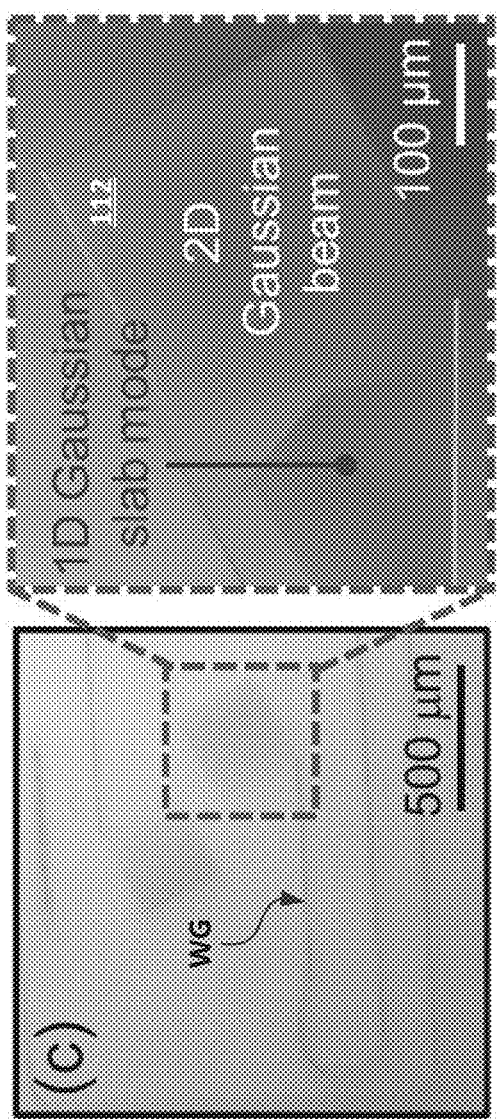
FIG. 1C
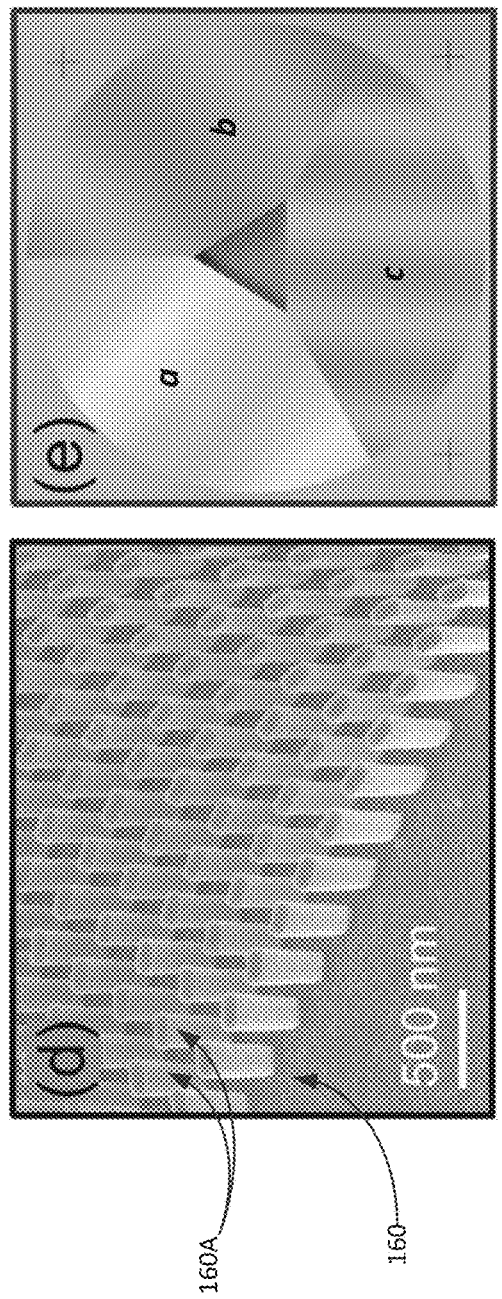
FIG. 1E
FIG. 1D

PLANAR-OPTICS BASED LIGHT DELIVERY SYSTEM FOR MAGNETO-OPTICAL TRAPS AND METHOD FOR USING THE SAME

CROSS-REFERENCE TO RELATED APPLICATION(S)

The present application claims priority from and benefit of the U.S. Provisional Patent Application No. 63/196,559 filed on Jun. 3, 2021, the entire disclosure of which is hereby incorporated by reference herein.

STATEMENT CONCERNING FEDERALLY SPONSORED RESEARCH AND DEVELOPMENT

This invention was made with government support under 70NANB14H209 awarded by the National Institute of Standards and Technology (NIST). The government has certain rights in the invention.

RELATED ART

Measurements utilizing gases of laser-cooled atoms are presently confined to controlled laboratory environments due to the large-scale optical assemblies required to prepare and manipulate cold gases. Methods miniaturization, simplification, and integration of laser-cooling technology impact applications including clocks, inertial sensors, magnetometers, vacuum sensors, quantum simulation, and quantum networking, to name just a few. Preparing atoms into a magneto-optical trap (MOT) is a key step in these applications, and efforts to miniaturize MOT designs have centered around replacing conventional 6-beam designs with single-input-beam alternatives such as pyramid MOTs and grating MOTs (GMOTs). While these methods provide significant simplification of the optical hardware required for laser cooling, while lithographically fabricated grating chips have broadened the scope of GMOT design (including the realization of integrated Zeeman-slowing, grating-based two-dimensional (2D) MOTs, and new methods for trapping alkaline earth atoms), and photonic integrated circuits (PIC) fabricated on $SiN_x$ platforms have enabled chip-based interrogation of warm atomic vapors for clock applications, mass manufacturable solutions that provide a substantially miniaturized laser-cooling platform in which constituent components of at least optical systems configured to deliver light to an MOT are configured as nanophotonic components that can be lithographically fabricated and integrated to form a portable, manufacturable package remain desired.

SUMMARY

Embodiments include a method for controlling parameters of a beam of light. Such method, performed during a process of forming a magneto-optical trap (MOT) for an atom with the use of a first beam of light outcoupled from a planar photonic integrated circuit (PIC) element, includes a step of transforming the first beam of light by having the first beam of light interact with a first optical system to produce a second beam of light having a substantially non-Gaussian profile at a pre-defined distance from the PIC element while, at the same time, defining a cross-sectional area of the second beam at the pre-defined distance to be at least $10^4$ times larger than that of the first beam of light at the PIC element, wherein the pre-defined distance is within a range from about 1 mm to about 200 mm. Alternatively or in addition, and in at least one implementation, the step of transforming may include producing the second beam of light having a substantially flat-top profile at the pre-defined distance, and/or the method may additionally include spatially separating, at the first optical system, a zeroth order of diffraction of the first beam from a non-zeroth order of diffraction of the first beam, and delivering light from the non-zeroth order of diffraction as said second beam of light to a second optical system, disposed at the pre-defined distance, to form the MOT. When such spatially-separation takes place, the method may additionally be configured to satisfy one or more of the following conditions: (a) the delivering includes delivering the second beam of light having a state of polarization that is substantially uniform across the second beam; and (b) the transforming includes controlling the state of polarization of the second beam of light only with the first optical system. In one specific implementation of the method, the second optical system may include a diffraction grating; and/or the first optical system may include a metasurface that is configured (i) to modify a state of polarization of light incident thereon to form the second beam with a state of polarization that is substantially uniform across the second beam, and (ii) to cause the second beam have a substantially flat-top profile at the pre-defined distance by introducing a spatially-dependent phase delay into light of the first beam incident thereon while, at the same time, effectuating said spatially-separating by introducing a linear gradient into the light of the first beam; and/or (iii) the action of spatially separating occurs in transmission of light of the first beam through a component of the first optical system. In at least one specific implementation of the method, the step of transforming may include producing the second beam having (at the pre-defined distance) a cross-section that is substantially congruent with an active area of the diffraction grating; and/or the method may additionally include a step performed during interaction between the first beam of light and the first optical system and containing and action of defining a state of polarization of the second beam of light to be circular; and/or an action of changing a state of polarization of light propagating through the first optical system from a first state of polarization to a second state of polarization that is orthogonal to the first state of polarization. Alternatively or in addition, and in at least one implementation, the method may include outcoupling the first beam of light having a substantially Gaussian spatial profile from a waveguide of the PIC through a diffractive optical element of the PIC in a direction that is tilted with respect to a normal drawn to a surface of the PIC; and/or defining a volume of space in which the second beam and each of beams, formed by the second optical system in response to being irradiated with the second beam, overlap simultaneously. In one related implementation, the step of transforming may include producing the second beam having, at the pre-defined distance, a substantially circular cross-section. In at least one specific case, the step of transforming may include (a) transmitting light of the first beam of light through a quarter-wave plate and interacting such light with a metasurface comprising surface structures each of which is configured as half-wave phase retarder at a wavelength of the first beam of light; and/or (b) producing the second beam of light in which the substantially flat-top spatial profile occurs only at the pre-defined distance from the PIC element; and/or (11c) propagating light of the first beam of light through the first optical system each component of which is a planar optical component.

Embodiments further provide an optical apparatus having an axis. Such optical apparatus is configured as a part of a magneto-optical trap for an atom and includes a planar optical waveguide component having an outer surface, and a first optical system that is configured (a) to accept a first beam of light, outcoupled from the planar optical waveguide component transversely to the outer surface, and (b) to transmit a portion of light of the first beam of light as a spatially-expanding optical beam, defined by a non-zero order of diffraction of light at the first optical system, to a plane in which a distribution of irradiance of said spatially-expanding optical beam is substantially different from a Gaussian distribution. The optical apparatus further includes a second optical system disposed at the plane and configured to transform the spatially-expanding optical beam incident thereon into a plurality of return optical beams, each of which overlaps with each of the plurality of return optical beams and the spatially-expanding beam within the same volume of space. An embodiment of the optical apparatus may be configured to form the spatially-expanding optical beam such that a cross-sectional area of the spatially expanding optical beam, measured at the plane, exceeds a cross-section of the first beam of light at the planar optical waveguide component by at least a coefficient of $10^4$, and where the distribution of irradiance is the plane to which the spatially-expanding optical beam has been transmitted is a substantially spatially-uniform distribution. Alternatively or in addition, the first optical system may include (a) a birefringent substantially planar metasurface that is dimensioned to transform light incident thereon into light having a circular polarization and a phase profile component corresponding to a phase shift that is introduced by a lens with a negative optical power into light propagating through such lens, and/or (b) an optical retarder, disposed between the birefringent substantially planar metasurface and the planar waveguide component, where the birefringent substantially planar metasurface is configured to change a first state of polarization of the light incident thereon (which light has been outcoupled from the planar optical waveguide component and that has traversed the optical retarder) to a second state of polarization that is orthogonal to the first state of polarization. In the latter case, the birefringent substantially planar metasurface may be judiciously structure to include only surface features each of which is a half-wave optical retarder at a wavelength of the first beam of light, and/or to satisfy a condition where the planar optical waveguide component is configured to outcouple light propagating therein as the first beam of light directed transversely to a normal drawn to the outer surface, and/or where the first planar optical system includes a substantially planar metasurface configured to transmit light therethrough to form said spatially-expanding optical beam propagating at a non-zero angle with respect to the normal to a surface of the first optical system. Alternatively or in addition—and at least in one implementation—the first optical system may include a substantially planar metasurface configured to operate as a combination of an optical prism and an optical lens with a negative optical power, thereby deviating a beam of light propagating therethrough from an original direction of propagation while spatially expanding such beam of light. Additionally or in the alternative—and in at least one implementation—the second optical system of the optical apparatus may include either a substantially planar diffraction grating having multiple surface areas (each of such multiple surface areas characterized by a corresponding optical diffractive structure, a first optical diffractive structure and a second optical diffractive structure being different from one another and/or being spatially oriented in a different fashion with respect to a chosen reference point) or an array of spatially distinct diffraction gratings having corresponding optical diffractive structures (where different diffraction gratings having different optical diffractive structures and/or being differently oriented with respect to the chosen reference point). In at least one specific case, each and every optical component of the first optical system and the second optical system is a planar optical component.

Embodiments further provide a method for propagating light. Such method includes: —outcoupling light from a waveguide of a planar integrated circuit (PIC) element in a first direction at a non-zero angle to a surface of the waveguide; —changing a degree of spatial divergence, a direction of propagation, and a state of polarization of a first portion of such light by transmitting such portion through a birefringent planar metasurface while relaying a second portion of such light in the first direction; —propagating a spatially-expanding first portion of the light from the birefringent planar metastructure/metasurface at a pre-defined distance through a substantially optically uniform medium to define a cross-section (of the first portion) that has a substantially uniform distribution of irradiance in a plane transverse to an axis of the first portion of the light; and—substantially simultaneously diffracting the first portion of the light at multiple different surface areas of a planar diffractive optical device, disposed in the plane, to form multiple diffractive optical beams spatially-intersecting each other and the first portion of the light at the very same spatial location. In at least one embodiment, the method may additionally include (a) transmitting light through an optical retarder along an axis coinciding with the first direction; and/or (b) impinging light from the waveguide onto the birefringent planar metasurface at an angle substantially equal to the non-zero angle. At least in the latter case, the substantially simultaneously diffracting may include diffracting the first portion of the light at multiple difference surface areas that have different diffractive characteristics, and/or the changing a state of polarization may include delivering light of said first portion with a circular polarization upon transmitting light through the birefringent planar metasurface, and/or the metasurface may include only surface structures each of which is configured as a half-wave optical retarder for said light outcoupled from the waveguide, and/or the propagating may include defining the cross-section that is substantially congruent with an area of the planar diffractive optical element. (The step of defining a cross-section may be configured to define a substantially circular cross-section.) Alternatively or in addition—and at least in one specific embodiment—the step of substantially simultaneously diffracting may be configured to not produce light reflected by the planar diffractive optical element along an axis of an optical beam defined by the first portion of light; and/or the step of changing a direction of propagation may include delivering light of the first portion in a direction substantially perpendicular to the surface of the waveguide upon transmitting said light through the birefringent planar metasurface; and/or the method may further contain a step of passing light from the second portion outside of boundaries of the planar diffractive optical device and substantially without illuminating the planar diffractive optical device with the light from the second portion. In at least one specific implementation, the step of propagating a spatially-expanding first portion of the light from the birefringent planar metastructure at the pre-defined distance may be judiciously defined as propagating the first portion at a distance within the range not exceeding 200 mm.

BRIEF DESCRIPTION OF THE DRAWINGS

Aspects of the present disclosure will be more fully understood by referring to the following Detailed Description of Specific Embodiments in conjunction with the Drawings, of which:

FIGS. 1A, 1B, 1C, 1D, 1E, and 1F illustrate a specific embodiment of a planar-optics-based GMOT apparatus. FIG. 1A: A linearly polarized Gaussian beam, launched from the PIC, is circularly polarized during traversal through an optical quarter-wave plate (QWP). The planar optical component including a judiciously devised metasurface (MS) generates a spatially-expanding mode of light with an orthogonal (opposite) polarization while forming a flat-top intensity profile of such mode at the segmented grating chip. Each of the three first-order diffracted beams (respectively generated by diffraction at a corresponding one from each of the spatially-distinct and non-overlapping with one another grating segments) overlap with the incident light at the same point of space to form the four-beam GMOT. Positive and negative first orders of diffraction from one grating segment are shown. In this specific example, the GMOT is realized inside a glass vacuum chamber with a magnetic quadrupole field created by external electromagnets. FIG. 1B provides an illustration of a first order diffraction beam emanating from the grating chip and the status of polarization of such a beam. FIG. 1C presents an optical image of a first planar layer component (of the GMOT apparatus of FIG. 1A) that includes a PIC carrying waveguide and EMC structures therein/thereon. Inset to FIG. 1C illustrates components of the EMC. FIG. 1D is a scanning electron micrograph showing a two-dimensional array of metasurface pillars/columns dimensioned and spatially-oriented to generate a desired polarization-dependent phase profile of light upon interaction of such light with the MS. FIG. 1E is an optical image of a three-segment grating chip (of the GMOT of FIG. 1A); ruled region has an approximately 22 mm diameter. FIG. 1F is a cross-section of the system of FIG. 1A providing detailed geometry of the apparatus. Dotted lines indicate Gaussian and flat-top intensity profiles. Beams' polarizations in this example are left-hand circular (LHC) and right-hand circular (RHC). Star point indicates GMOT position. Inset to FIG. 1F illustrates atomic fluorescence at 780 nm empirically generated with the use of the apparatus of FIG. 1A and the laser-cooling beams at Rb partial pressure of about $1\times10^{-4}$ Pa.

FIG. 2A: Intensity of the flat-top and $0^{th}$ diffractive order beams at about 150 mm from the location of the MS (which is substantially equal to the distance between the MS and the grating chip). FIG. 2B: a slice/cross-section of the intensity profile along the x-axis (formed along an arrow indicated in FIG. 2A) evidences substantial spatial uniformity of the flat-top distribution of irradiance of light formed in a given diffraction order by the MS at a predetermined distance from the MS. FIG. 2C: a computed phase profile of the MS planar optical structural layer, of the apparatus of FIG. 1A, including both the beam-shaping and prism phase contributions. MS area is 300 μm×300 μm. FIG. 2D schematically illustrates an MS unit cell (a pillar or column) configured to introduce a predetermined phase delay to light propagating therethrough (in a discussed example—a quarter-wave phase pillar). Rotation of the pillar in the plane of the MS structural layer defines the local geometrical phase shift of the light.

Figure 1F:
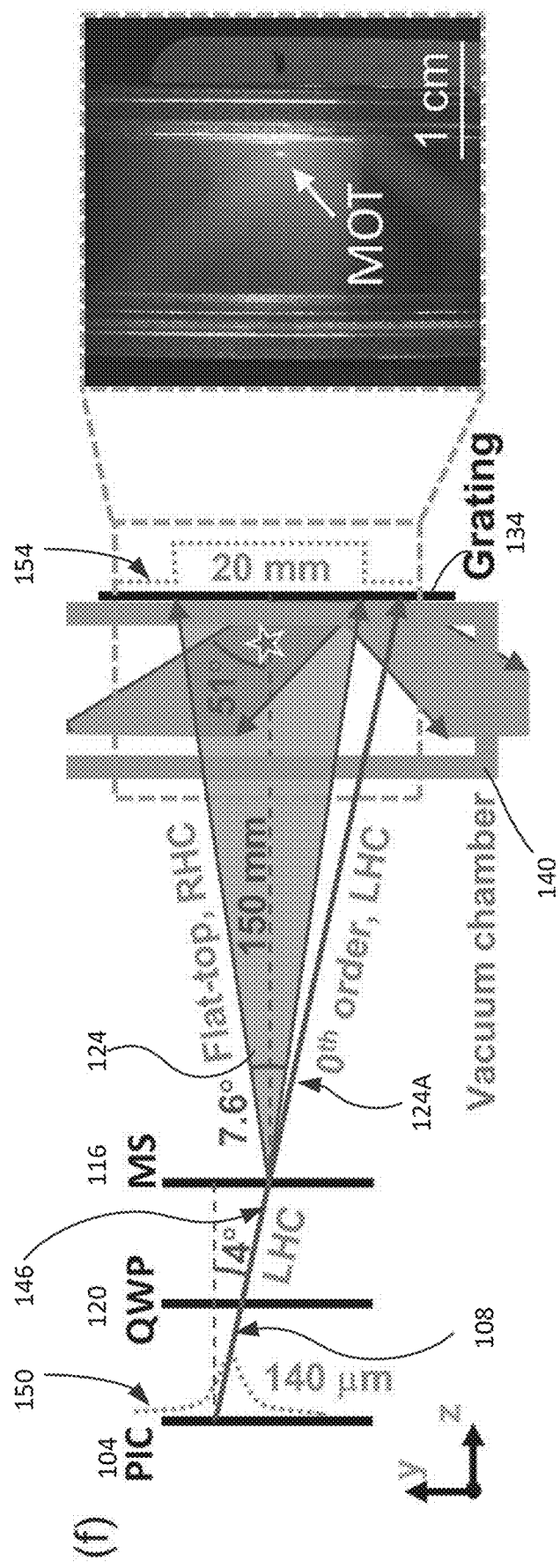

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

Laser-cooled atoms are a key technology for many calibration-free measurement platforms—including clocks, gyroscopes, and gravimeters—and are a promising system for quantum networking and quantum computing. The optics and vacuum hardware required to prepare these gases are often bulky and not amenable to large-volume manufacturing, limiting practical realization of devices that benefit from the properties of cold atoms. Furthermore, one striking disadvantageous characteristic of the existing implementations of diffraction-gratings based MOTs is a waste of the MOT illuminating light—which understandably translates to unnecessarily lowered efficiency of the overall MOT system. (As is well known in related art, this is typically caused by the fact that the spatial profile of the grating-chip irradiating light of the GMOT is a substantially Gaussian profile. In a Gaussian-beam illuminated GMOT, illumination of the grating chup is typically accomplished using beam waist of similar or larger dimension than the clear aperture of the grating, which is a current standard in related art. See, for example, Eckel S, et al., Challenges to miniaturizing cold atom technology for deployable vacuum metrology *Metrologia* 55 S182-S193, 2018; or McGilligan J P, et al., Grating chips for quantum technologies *Scientific Reports* 7, 2017; to name just a few). Light falling outside of the grating aperture is expressly lost or wasted as it is not used in formation of the trap for atoms.

In advantageous contradistinction, planar, lithographically produced optics including photonic integrated circuits, optical metasurfaces, and gratings judiciously cooperated with one another according to embodiments of the present disclosure not only offer a pathway to developing chip-scale, reduced size and cheaply manufacturable devices utilizing cold atoms but (according to some estimates presented below in reference to embodiments) such devices use at least 2.5 times less optical power to observe the onset of atom trapping as compared to that required by a conventionally structured GMOT.

The problem of complexity of the processes of manufacturing of optical systems for light delivery and alignment of the constituent components of such systems to enable magneto-optical trapping of atoms, persisting in related art, is solved by devising an optical apparatus a production of which is substantially completely defined by only lithographic processing, each and every component of which is a planar—as opposed to bulk—optical component (although lithographically-defined optical components with curved surfaces remain within the scope of the proposed solution), thereby allowing such apparatus to be formatted as a set of spatially stackable lithographically-defined optical components substantially free of the need of judicious alignment. The proposed solution also solves an additional problem caused by operation of light-delivering sub-systems of conventional magneto-optical traps (MOTs) for atoms—specifically, the problem that manifests in wasting (that is, not utilizing) a substantial part of light delivered to such traps (due to, for example, not utilizing light necessarily falling outside of the grating aperture in the case of the diffraction-grating-based MOT). Here, the combination of the proposed planar optical components is configured to define a cross-section of the light beam delivered to the MOT to be not only substantially spatially congruent with and having a substantially equal foot-print with the optical system utilized by the MOT (such as, in the considered specific example, the diffracting grating) but also possessing a judiciously engineered, transformed (as compared with that used in the conventional systems) transverse profile of irradiance, thereby minimizing or even eliminating the amount of delivered light not usefully processed by the MOT.

As a result of the planar-optics nature of such optical apparatus, the corollary problem of ever-desired minimization of the spatial extent of such optical apparatus is also solved, in that the apparatus lends itself to generally not exceed a few inches (for example, 6 inches or less) in linear extent, and in some specific embodiments—no longer than 3 cm, preferably no longer than 2 cm, even more preferably no longer than 1 cm. Notably, in the configuration where the proposed all-planar lithographically-defined light delivery apparatus is placed in the vacuum chamber of the MOT system, the typical linear extent of such apparatus can be practically reduced to be shorter than 1 cm, and preferably no longer than 5 mm. (This is in advantageous contradistinction with the systems of related art, the operation of which utilizes collimated beams of light used for illumination of the diffraction grating of the MOT systems.)

For the purposes of this disclosure and the appended claims, and unless expressly defined otherwise, the term "optical metasurface" (interchangeably used below simply as "metasurface") is typically used in related art to refer to a material interface that has structures on it that impose particular phase shifts on light interacting with this material interface (that is, which is either transmitted through or reflected off the interface). In some cases, the optical metasurface may include a planar array of subwavelength electromagnetic structures that emulate the operation of a conventional, bulk refractive, birefringent, or diffractive optical component (such as, in non-limiting examples, a lens, a waveplate, or a hologram) through individually tailored amplitude, phase, or polarization transformations imposed by the metasurface on incident light with which such metasurface interacts. The term "spatial profile of a beam of light" (interchangeably—a transverse profile of a beam of light) and related terms are used to describe a transverse distribution of irradiance or intensity of the beam of light and are generally defined as a profile of irradiance or intensity of the beam at hand in a plane that is substantially perpendicular to the axis of such beam. A flat-top profile (or, a uniform profile) of a beam of light is that which possesses a substantially uniform or substantially constant irradiance or intensity distribution across the beam (that is, as would be understood by a skilled person, over most of the cross-sectional area of the beam, within the limits acceptable by the system utilizing such beam of light, and regardless of the phase-distribution across the beam; see, for example, at rp-photonics.com). A normal to a surface is defined as a vector that is perpendicular to the surface at a given point. The terms "planar optics", or "planar optical component", or "planar structural layer" as well as related terms refer to and are defined as those denoting substantially completely and fully lithographically-fabricated micro- and nano-sized photonic components, layers, etc. The term congruent is defined coinciding at all points when superimposed (and, in reference to two surfaces—coinciding substantially at at least 90% of the surface area).

The discussed examples of embodiments relate to and address the laser cooling methodology using a light delivery system or apparatus that includes planar optical elements operating at 780 nm, with the specific implementations demonstrating a GMOT of $^{87}$Rb. A skilled person, however, will readily appreciate that these are but specific examples and generally the scope of the disclosure covers a method for controlling parameters of a beam of light during a process of forming a magneto-optical trap for an atom with the use of a beam of light outcoupled from a planar photonic integrated circuit (PIC) element and processed by (interacting with) a collection of planar optical devices, a corresponding diffractive optical light delivery system in which each of the constituent components is a planar optical component, and related method of propagating of light through the planar optical system configured to deliver light to the MOT.

In particular, this disclosure addresses a system (generally, a magneto-optical trap for atoms) that includes an optical diffractive apparatus configured as a system of light delivery to such MOT. The optical diffraction apparatus has an axis and, according to embodiments includes a first structural planar-optics (or, interchangeably, planar optical) layer and a second structural planar-optics layer generally disposed substantially in parallel to and/or stacked upon the first structural layer. The first structural layer is a layer of a planar integrated circuit containing an optical waveguide disposed substantially in a first plane transverse to the axis, while a second structural layer includes a two-dimensional array of spatially-separated from one another rods or columns or pillars of material. Such an array defines a second plane transverse to the axis. The second structural layer is configured to receive a first beam of light (that has a first degree of divergence and that is formed from light channeled by the optical waveguide to propagate transversely to the axis) and to transform such first beam of light into a second beam of light having a second degree of divergence that is different from the first degree of divergence.

Optionally—but in a specific implementation discussed below in reference to FIGS. 1A through 1F, preferably—the optical diffractive apparatus may additionally contain a third structural planar optics layer disposed between the first and second structural layers and structured as a substantially plane-parallel plate of birefringent optical material. Substantially in any implementation, the optical diffractive apparatus may additionally include an optional fourth structural planar optics layer that is separated from the first structural layer by the second structural layer, and that is configured to transform the second beam of light received from the second structural layer into multiple beams of light propagating in a direction of the second structural layer. (In at least one specific embodiment, the fourth structural layer may be configured to not reflect or diffract light incident thereon along the axis.) Alternatively or in addition, such a fourth structural layer may be configured to form multiple diffractive beams of the same order of diffraction (these multiple diffractive beams originate at different respectively-corresponding locations but all overlap at the same point between the second and fourth structural layers). The skilled person will readily appreciate that at least one (and preferably two) structural layers of the discussed optical diffraction apparatus are configured as diffractive planar optic components that in operation form diffracted beams in various orders of diffraction from light incident on such components. Notably, the apparatus is dimensioned to provide for extreme increase of a cross-sectional area of the light beam (generally, in excess of $10^4$ and up to $10^{10}$) between the moment when light exits the first structural layer to the moment it is delivered to the vicinity of the location of the MOT (and, specifically, to the location of the optional fourth structural layer that is between 1 mm and 200 mm away from the second structural layer). In one case, the linear dimension of the cross-section of the beam is increased from a few hundreds of nanometers to about 140 microns upon the outcoupling of light from the first structural layer, and from about 140 microns to about 1 cm or so upon free-space propagation of light from the second structural layer to the location of the fourth structural layer.

Examples of Specific Non-Limiting Embodiments of an Apparatus

One of the practical challenges remaining unsolved by related art is efficient conversion of the dimensions of the input light beam—that is, a cross-sectional size of spatial light distribution at the entry of the system of delivery of light to MOT—to a free-space mode of centimeter scale, required for formation of the operationally viable laser-cooling volume at the location of the MOT. Beam expansion is necessary as magneto-optical trapping is inefficient with millimeter-scale or smaller laser beams due to the finite optical scattering forces present in laser cooling. It is also necessary to increase the capture rate into the MOT, which scales strongly with the size of the laser cooling beams.

According to embodiments-and in reference to the schematic of FIG. 1A illustrating in part an example of system 100 of a light-delivery apparatus—a multi-stage or multi-step approach is used to expand a light beam represented by a waveguide mode emanating from the first structural layer (shown as a PIC 104). At the first stage, the size of the waveguide mode propagating through PIC 104 (which defines a first structural layer I of a system 100) is expanded via outcoupling of such light in the form of beam 108 through the extreme mode converter, EMC, shown as an element 112 of the PIC 104. As shown, the beam 108 may preferably have a linear polarization. At the second stage, with the use of the second structural layer II (which includes a dielectric metasurface MS 116, configured to operate as an aspheric beam-shaper while changing the state of polarization of light 108 upon interaction of light 108 with the MS 116), a re-shaped free-space propagating beam 124 is formed. In the example of system 100, the MS 116 is shown to operate in transmission, but a skilled person can understand that in a related embodiment the interaction between light of the beam 108 and the MS 116 can alternatively or in addition be arranged in reflection. Optionally, in a specific embodiment (which is actually illustrated in FIG. 1A), the light-delivery apparatus may be complemented by yet another structural layer (labelled here as III and illustrated with a dashed bracket) that, as shown includes a substantially plane-parallel optical plate 120 in this case configured as a quarter-wave plate QWP at the wavelength of light 108.

The shaped free-space beam of light 124 is further delivered to an additional structural layer of the system 100 while expanding the cross-sectional area of the beam by a factor of at least $10^4$ (and at least $10^8$, or even about $10^{10}$ in one case) as compared to that of the modal distribution of light in the waveguide of the PIC 104. Here, layer IV is shown to be represented by a spatially segmented (with three segments, in implementation illustrated in FIG. 1B), reflective grating chip or element 134 (grating, for short). This specific implementation of the structural layer IV is configured to return incident light of beam 124 in the form of multiple (three, as illustrated) return beams (as shown-138A, 138B, 138C) to aggregately form a multiple-beam (in this example-four-beam) MOT within a conventional glass vacuum chamber 140 disposed in the vicinity of the structural layer IV. The spatial coordination of the structural layers II and IV is such that the free-space propagating beam 124 and all of the return beams (here, 138A, 138B, 138C) simultaneously overlap in the same spatial point/location/volume 142.

Specifically, in the example of FIG. 1A, a linearly polarized beam 108 is launched from the PIC 104 and, upon the transmission through the QWP 120 becomes circularly polarized (LHC, as shown) beam 146, from which the MS 116 generates an expanding light mode of orthogonal polarization (RHC, as shown) as a non-zero order diffraction beam 124, which realizes a substantially flat-top intensity profile at the location of the structural layer IV. (The unused zeroth order diffraction beam—or a portion of transmitted through the MS 116 beam 146—is shown as 124A. The GMOT is realized inside a glass vacuum chamber with a magnetic quadrupole field created by external electromagnets. FIG. 1B illustrates first order diffraction and beam polarizations (arrows) of the beams diffracted at the grating chip 134 of the structural layer IV as a result of irradiation of the grating chip 134 with the incident beam 124. FIG. 1C provides an optical image of the planar structural layer/(PIC 104) showing an optical waveguide WG and a corresponding EMC structure 112. Inset illustrates components of the EMC 112. FIG. 1D is a scanning electron micrograph of the 2D-array 160 of MS pillars 160A configured to generate a polarization-dependent phase profile of the beam 124. FIG. 1E is an optical image of a specific implementation of the planar structural layer IV in the form of a three-segment grating chip (alternatively, an array of spatially distinct grating chips can be employed); a ruled region has a 22 mm diameter. FIG. 1F schematically presents a cross-section of the schematic of FIG. 1A with some detail of geometry of the system 100. Dotted lines 150, 154 indicate a Gaussian spatial profile of intensity/irradiance of a beam 108 emanating from the PIC 104 and a substantially flat-top profile of the beam 124 at the structural layer IV, respectively. Star point indicates GMOT position. Inset to FIG. 1F shows atomic fluorescence at 780 nm from the GMOT and the laser-cooling beams at Rb partial pressure of ≈$1\times10^{-4}$ Pa.

The skilled person will readily appreciate, therefore, that an embodiment of an optical apparatus includes a planar optical waveguide component having an outer surface; a first optical system; and a second optical system. The first optical system is a planar optical system that is configured to accept a first beam of light, outcoupled from the planar optical waveguide component transversely to the outer surface, and to transmit a portion of light of the first beam of light as a spatially-expanding optical beam, defined by a non-zero order of diffraction of light at the first optical system, to a target plane in which a distribution of irradiance of the spatially-expanding optical beam is substantially uniform. The second optical system is disposed in the target plane and configured to transform the spatially-expanding optical beam incident thereon into a plurality of return optical beams, each of which overlaps with each of the plurality of return optical beams and the spatially-expanding beam within the same volume of space. Such optical apparatus is configured as a part of a magneto-optical trap for an atom. In one specific implementation, the optical apparatus is configured to form the spatially-expanding optical beam such that a cross-section of the spatially expanding optical beam, measured at the target plane, exceeds a cross-sectional area of the first beam of light at the planar optical waveguide component by at least a coefficient of $10^4$ and even $10^{10}$ (as discussed in presented herein specific example of implementation).

Additional Technical Details

The PIC component 104 is preferably configured to projects a linearly polarized Gaussian beam 108 in a direction tilted with respect to the normal to the surface of the PIC (at about 4°, in implementation shown in FIG. 1F) which—as a skilled artisan will readily appreciate—allows to maximize the efficiency of outcoupling of light from the waveguide of the PIC 104 when the outcoupler is structured as a diffraction grating, for example. The QWP 120—when used—converts polarization of the beam 108 from linear to circular and transmits the circularly polarized light as beam 146 towards the MS 116. The dielectric (transmissive, in the case shown) MS 116 is preferably disposed such that the beam 146 (or, in absence of QWP 120—beam 108) strikes the MS 116 at a non-zero angle with respect to the respective normal (if and when at about 4°, the plane of the MS 116 and the plane of the PIC 104 are substantially parallel to one another). The change of the phase profile, imposed on light by the structure of the MS 116, causes the beam to deflect preferrably substantially perpendicularly to the MS 116 and to diverge such that an approximately flat-top intensity profile is realized at a predetermined distance away from the MS 116 (in one example—after expanding the beam 124 over an approximately 150 mm distance). At this predetermined distance, where the beam 124 was measured to be about 20 mm in diameter, it was impinged on the three-segment diffraction grating chip 134. The grating chip 134 (FIG. 1B) was designed to diffract light into a first diffraction order at about 51° (under condition of normal incidence) at a predetermined wavelength (780 nm in one experiment). Three diffracted first order beams one from each of the grating segments (a, b, c, as shown in FIG. 1E), were made to overlap with the flat-top mode of the incoming beam 124 within a glass-walled vacuum chamber or cell 140 to form the laser-cooling volume of the GMOT of FIG. 1A. External electromagnets (schematically illustrated in FIG. 1A) were used to generated a quadrupole magnetic field the center of which resided in the laser beam overlap volume. The arrangement of the overlapping beams and the quadrupole magnetic field provided confining forces both along the z-axis and in the radial (x-y) plane of the GMOT. The glass cell 140 was attached to an auxiliary chamber containing an ion pump and a Rb dispenser used to generate adjustable partial pressures of Rb.

The $SiN_x$-based PIC 104 (FIG. 1C), which was used to launch the Gaussian beam 108 into free space, included a waveguide WG and an EMC 112 (similarly to the design described in Kim S. et al., in *Light: Science & Applications* 7 72, 2017 or in Yulaev A, et al. in *International Conference on Optical MEMS and Nanophotonics* (*OMN*) 2018 International Conference on Optical MEMS and Nanophotonics pp 1-2, 2018, the disclosure of each of which is incorporated herein by reference). The PIC 104 in one case was fabricated from a 250 nm thick layer of nominally stoichiometric silicon nitride ($SiN_x$) clad from both sides in 3 μm of silicon dioxide ($SiO_2$) with photonic structures defined using electron-beam lithography followed by reactive-ion etching. In operation of an embodiment, light was edge-coupled into the fundamental $TE_0$ mode of the PIC waveguide WG of 250 nm×300 nm cross-section, aided by an inverse taper at the edge of the chip that adiabatically expands the optical mode to increase coupling efficiency of free-space light into the waveguide. Light was further guided for about 5 mm across the chip of the PIC 104 to the EMC 112 where it was evanescently coupled into a $SiN_x$ slab mode and then scattered into free-space using an apodized outcoupling grating structure to form a substantially circular in cross-section, collimated Gaussian beam 108 with an $1/e^2$ radius of about 140 μm at an angle of about 4° from the surface normal (along the −y axis of the local system of coordinates; see FIG. 1F). In the EMC 112, both the slab-mode coupling and the apodized outcoupling grating scattering rate were spatially varied to project the desired collimated, 2D Gaussian intensity profile, thereby increasing the mode area by a factor of about $10^5$. The total power efficiency of the PIC 104-based structural layer I of the apparatus (from input of the waveguide WG to the output beam 108) was approximately 9% with input and output coupling losses of about 6.5 dB and about 3 dB, respectively. The free-space linearly polarized beam 108 emanating from the PIC 104 was converted to that with a circular polarization using a conventional QWP 120. (In absence of using the QWP 120, the beam 108 could be propagated directly to the MS 116.)

Figures 2A, 2B:
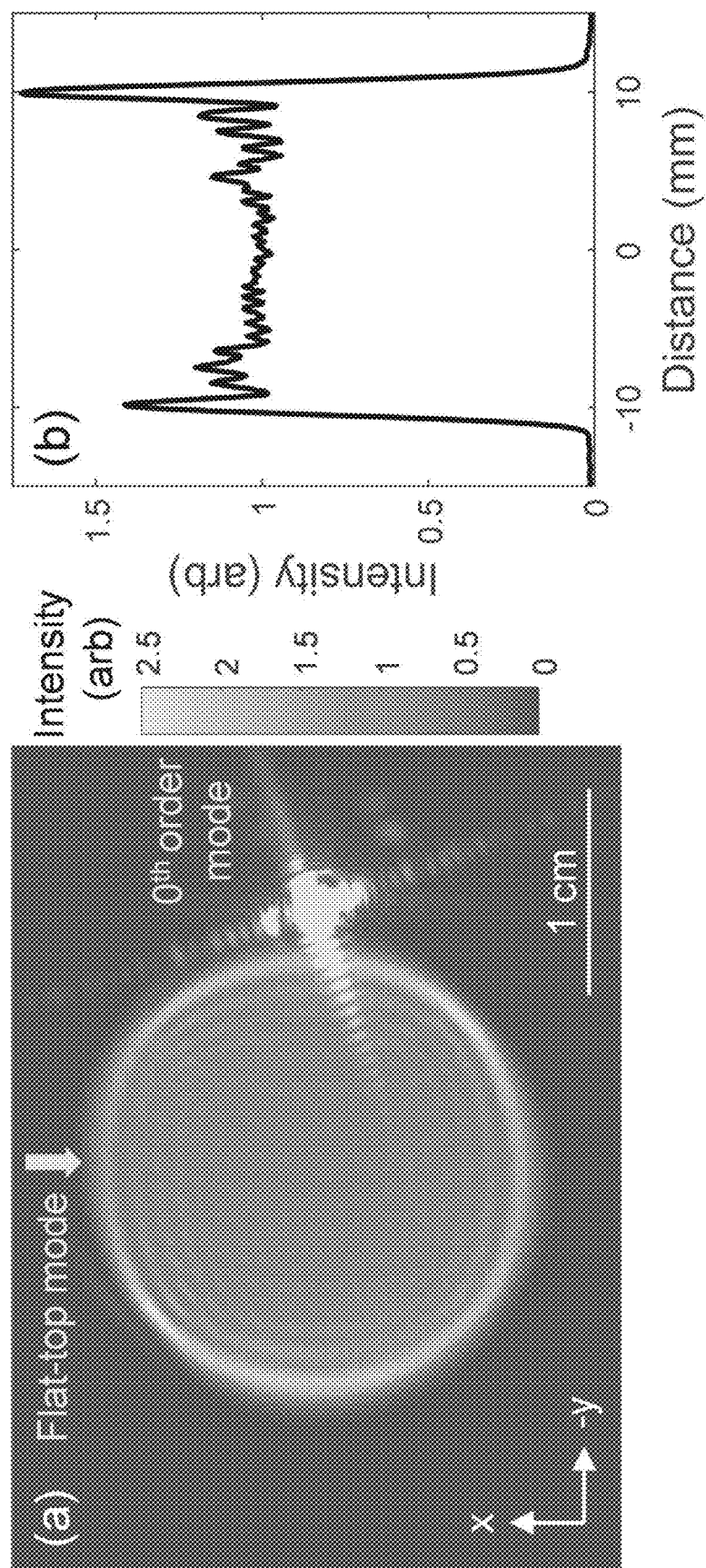
FIGS. 2A, 2B, 2C, 2D illustrate the process of characterization of the flat-top beam of laser light formed by a planar-optics based portion of the diffractive optical system of light delivery of the apparatus of FIG. 1A formed at the grating chip of the apparatus.

The MS 116 was that of a Pancharatnam-Berry (PB) type MS (see, for example, Bomzon Z. et al. *Opt. Lett.* 26 1424-6, 2001) composed of dielectric Si pillars (see FIG. 1D), was used to convert the PIC-launched Gaussian beam into a diverging beam 124 with half angle of 3.8°, such that a substantially flat-top intensity profile was realized at a distance d≈150 mm, and to redirect the beam 124 formed by light diffracted at the MS 116 in a non-zero diffraction order substantially perpendicularly to the MS optic with a deflection angle of 4° with respect to the original direction of propagation, as shown in FIG. 1F. Referring now to FIGS. 2A, 2B, the induced by the MS 116 divergence of the beam 124 enables the beam 124 to fill a substantially circular region of radius R≈10 mm such as to match the ruled region of the grating chip 134 disposed at distance d from the MS 116. The flat-top intensity of the cross-section of the beam 124, realized at the surface of the grating 134, provides substantially uniform illumination of the grating chip such that the generated optical forces from the incident and diffracted beams are approximately balanced across the intended laser-cooling volume. The 4° deflection allows spatial separation from the $0^{th}$ order transmission (beam 124A) and ensures a uniform polarization state of the expanding beam 124.

Figure 2C:
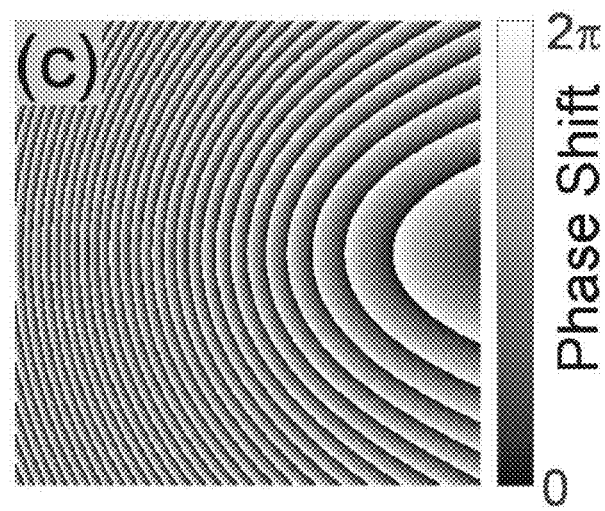
Figure 2D:
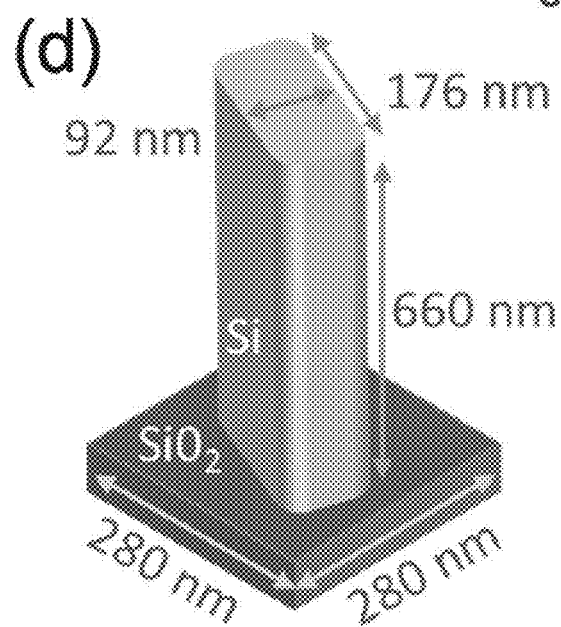

Referring now to FIGS. 2C and 2D, the MS 116 contained a two-dimensional array 210 of substantially rectangular, polycrystalline Si nanopillars supported by a fused-silica substrate and extending across the beam 108 and the axis of the optical light-delivery system. Individual pillars 214 (interchangeably referred to herein as columns or rods) resided on a square grid with about 280 nm spacing covering an area of about 300 μm×300 μm. These pillars or rodshad nominal in-plane dimensions of 92 nm×176 nm and a substantially constant (across the array 160 of the columns 160A) height of 660 nm. The geometry of Si pillars 160A have shape-birefringence such that each pillar 160A acted as a half-wave retarding element for 780 nm light (the wavelength of the Rb cooling transitions). (Understandably, in a related embodiment that is devoid of the QWP 120, the MS 116 can be configured to act as a quarter-wave tearding element.) Circularly polarized light 146 incident on these rod-like structures from the QWP 120 has its polarization handedness reversed and receives a local geometrical phase shift set by the in-plane rotational orientation of the pillars/rods 160A. The pillar-orientation-dependent phase shift is used to generate the desired phase profile and, understandably, varied to achieve a desired result in a related implementation. The metasurface 116 was substantially centered on the PIC-launched beam 108.

In the embodiment considered in reference to FIGS. 2A-2D, the phase profile encoded on the MS 116 was that of the planar equivalent of a prism complemented with a non-spherical, negative focal length lens. The phase profile was determined using a ray optics approach assuming that the local phase gradients $\phi'$ in the planar optic deflect normally incident light at an angle $\theta_z$ from normal as $$\sin(\theta_z) = \frac{\lambda}{2\pi n} \phi',$$

where $\lambda$ is the vacuum wavelength of light and n is the effective index of the propagating medium. The radially symmetric phase gradient, judiciously devised to map the power of an ideal Gaussian beam of $1/e^2$ radius w substantially uniformly into a circle of radius R at a distance d from the MS 116, can be expressed as:

$$\frac{d\phi}{dr} = \frac{2\pi n}{\lambda} \frac{1}{\sqrt{1 + \frac{d^2}{\left(R\sqrt{1-e^{-\frac{2r^2}{w^2}}} - r\right)^2}}} \quad (1)$$

Since this phase profile is not stationary upon propagation of the beam 124 as it depends on the distance d, the approximately flat-top distributions of intensity (FIG. 2B) was realized in a region around the design distance d away from the MS 116 which includes the capture volume of the overall MOT system. The 4° deflection was achieved using an additional linear phase ramp along the y-axis of the metasurface and spatially separated the flat-top mode from the undesired $0^{th}$ order transmission at the location of the grating 134. The composite phase profile of the beam 124 in the plane at the exit of light from the MS 116 is plotted in FIG. 2C.

The intensity profile of the flat-top beam was measured at the location of the diffraction grating 134 and caused high uniformity of light distribution over the mode area (FIG. 2C). Root-mean-squared (RMS) intensity variations were observed at 7% in the central 20% of the mode area and <20% over the central 80% of the mode area. It can be seen that two lobes with peak intensities≈2.5× the central mode intensity were formed on the periphery of the flat-top mode (as seen in a cross-section of the beam 124) and explained by the ≈4° incidence angle of the PIC-launched beam at the MS 116. While in practice these lobes likely altered the total GMOT capture rate, it is believed that the balance of forces at the location of the trapped atoms was minimally impacted by these lobes as they did not significantly overlap within trap volume. Ripples in the mode profile, observed in FIG. 2C, are explained both by diffractive effects during beam 124 propagation and spatially varying diffraction efficiency and optical absorption across the MS 116, primarily at the location of phase discontinuities. Notably, as the person of skill will readily appreciate, the spatial separation between the flat-top light 124 and the $0^{th}$ order beam 124A is required in practice as the peak intensity of the unshaped, $0^{th}$ order beam 124 is tens of time (in one case=up to a hundred time) higher than that of the flat-top mode 124 at the location of the planar structural layer IV of the optical apparatus. If not separated from the beam 124 and delivered to and overlap with the planar structural layer IV when such layer is represented by the grating 134, the intense, $0^{th}$ order beam 124 could distort or destroy the GMOT. High-order diffraction is seen in the $0^{th}$ order beam due to clipping of the Gaussian profile in the EMC.

The MS 116 had an experimentally verified conversion efficiency of light power incident upon it into the flat-top beam at the location of the structural layer IV of about 71%. The efficiency was limited by several factors including Fresnel reflection, optical absorption in Si due to above-bandgap operation, fabrication imperfections, and lithographic limits on the number of sub-wavelength elements 160A that can be placed within an optical wavelength. Other MS types, including designs based on propagation phase (as discussed, for example, in Yulaev A, et al., ACS Photonics 6, 2902-9, 2019, the disclosure of which is incorporated by reference herein), could be used to generate the desired circular polarization and phase profile simultaneously and without the use of QWP 120 as was already alluded to above).

Understandably, variations in absorption and diffraction, including the effect of phase discontinuities, exist in MS of all types and lead to spatial structure in the intensity distribution of the output beam. In the case of the spatially divergent beam 124 of the present embodiment, undesired spatial structure in the beam's intensity formed at the MS may likely persist as the beam propagates due to the beam's significant divergence. While such non-ideal intensity variations may undesirably detrimentally affect the performance of the overall GMOT system considered in reference to FIGS. 1A, 1F the PB-type MS utilized in current implementations offered acceptable variation in absorption and diffraction across the surface of the device. Notably, while it was chosen to use separate elements for the EMC and MS (respectively, elements 112 and 116), direct integration of metasurfaces with the EMC is possible and may be implemented in a related embodiment.

Figure 3:
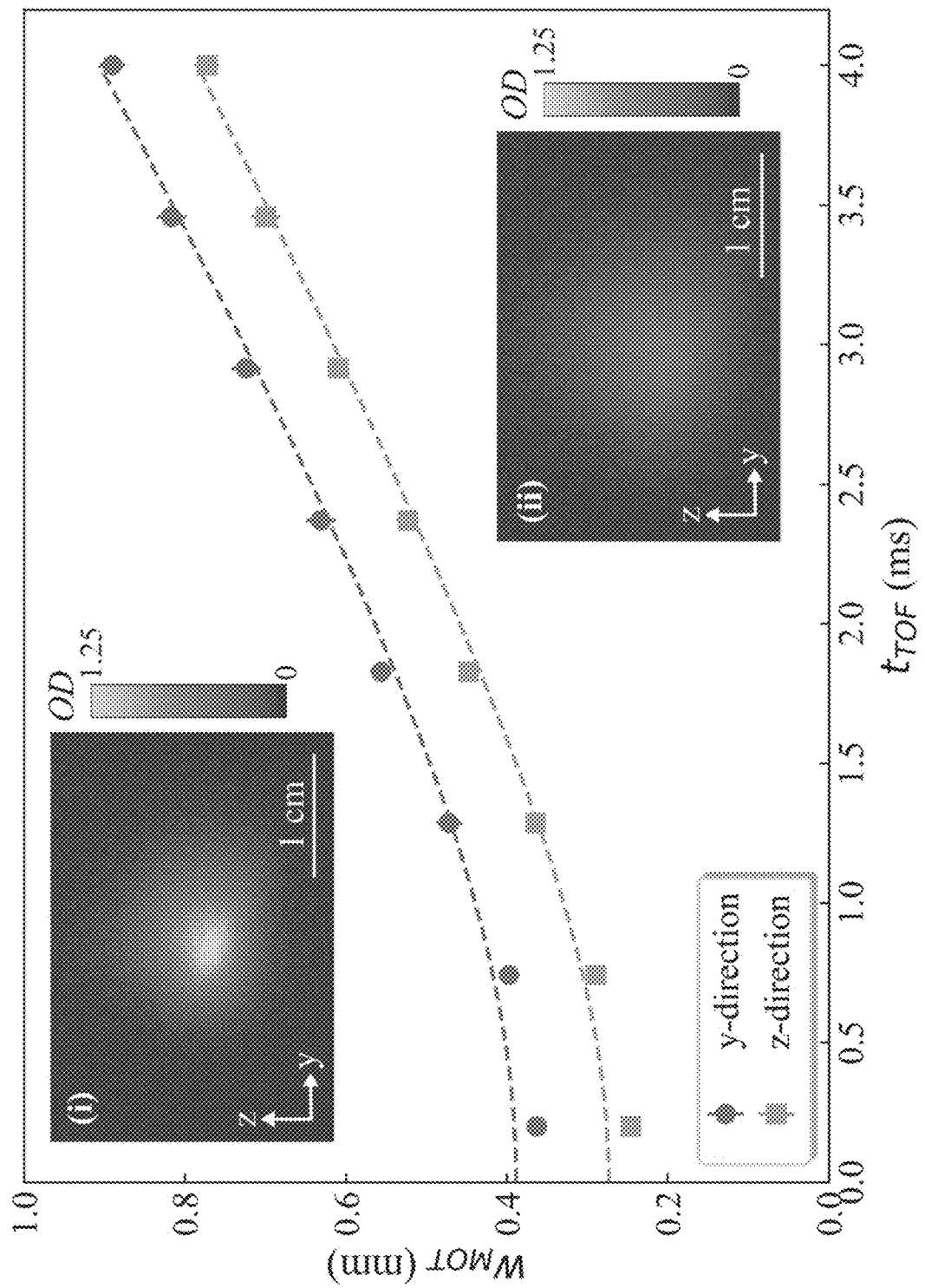
FIG. 3 illustrates the results of a time-of-flight temperature measurement. Temperature of the GMOT is ≈200 μK at $I_{trap}/I_{sat}$≈0.5. Insets show absorption images at $t_{TOF}$=(i) 1.8 ms and (ii) 3.5 ms.

Addressing now a specific implementation of the optional planar structural layer IV of one embodiment of the light-delivery apparatus—the one in which such structural layer IV was represented by the grating-chip 134—the grating 134 included, in one case, three one-dimensional diffraction grating sector segments a, b, and c (FIG. 1E) adjoined to one another such that axes of symmetry of each of these segments lying in the plane of the grating 134 were angularly separated from one another by 120 degrees in such plane. First order diffraction beams generated by each of the grating segments a, b, and c were directed substantially against the incoming beam 124 such as —together with the beam 124—to provide both axial and radial confining forces for the atoms in a spatial volume defined by simultaneous overlap each of the beams with each of the rest of the beams, thereby realizing a four-beam geometry GMOT. The grating chip was fabricated from Al-coated Si with periodic square grooves arranged with a nominal pitch of 1 µm and trench width of 500 nm. The ruled grating pattern filled a circular region with diameter of 22 mm. A triangular opening with an inscribed circular diameter of 3 mm (see in the center of the structure in FIG. 1E) was etched through the center of the grating chip 134 to eliminate reflected light along the beam axis. First order diffraction (beams 138A, 138B, 138C) for normally incident light 124 at 780 nm occurred at about 51.3° with a diffraction efficiency of approximately 33%. Such diffraction angle was chosen to provide a balance between axial and radial confining forces, thereby defining a nearly spherical GMOT as shown in FIG. 3. The optimal diffraction efficiency of ⅓ was approximated by controlling the etch depth and duty cycle of the grating 134, as known in related art. The grating was mounted ex vacuo parallel to the wall of the vacuum cell 140 substantially perpendicularly to the diverging beam 124 at the location of the flat-top cross section of this beam. The GMOT was formed at about 5 mm, along the −z-axis from the inside surface of the glass chamber wall, as can be seen in FIG. 1F. In one case, the overlap of the incident and diffracted beams 124, 138A, 138B, 138C created a GMOT trapping volume $V_{trap} \approx 0.34$ cm$^3$, which was partially restricted by the 4 mm wall thickness of the vacuum chamber 140.

Example of an Overall GMOT System Utilizing an Embodiment of the Light-Delivery Apparatus.

In one practical implementation demonstrating the operation of the MOT system utilizing the planar structural layers discussed above, the $D_2$ transitions in $^{87}$Rb were used. Laser cooling light was prepared using standard methods to address the $5S_{1/2} \rightarrow 5P_{3/2}$, F=2→F'=3 (trapping) and F=1→F'=2 (repumping) transitions near 780.24 nm (see, for example, Phillips W D 1998 Nobel Lecture: Laser cooling and trapping of neutral atoms *Rev. Mod. Phys.* 70, 721-41, 1998).

The laser-cooling beams were combined and coupled into the waveguide of the PIC 104 using fiber and free-space optics to match the 0.93 µm 1/e$^2$ mode radius at the waveguide facet. The transitions (separated by 6.6 GHz) had natural linewidths Γ of 2π×6.1 MHz and the trapping light had a saturation intensity $I_{sat} \approx 3.6$ mW cm$^{-2}$. Imaging of the GMOT was performed along an optical path substantially orthogonal to the axis of the beam 124 (x-direction in FIG. 1A, 1F). The loading rate of the GMOT was measured using fluorescence imaging while atom number and temperature are measured using absorption imaging in time-of-flight (TOF). (As known in related art, absorption imaging measures the optical depth (OD) of the gas, proportional to the atomic column density, as the natural logarithm of the ratio of incident to transmitted optical intensity.) During TOF expansion and imaging, the GMOT electromagnets and MOT optical fields was switched off. A permanent magnet created an ≈50 µT field along the x-direction to serve as a spin quantization axis for imaging.

Capture into the GMOT was maximized when the trapping light detuning was about −1.5 Γ and the axial gradient of the magnetic quadrupole field was about 0.11 T m$^{-1}$, consistent with values reported in related art. Repumping light, copropagating with the trapping light, was resonant to the repumping transition and had a central intensity of 25 µW cm$^{-2}$ for all measurements. In the low intensity limit, the trapped gas had an approximately Gaussian shape with 1/e$^2$ radii ($w_{MOT}$) of 270 µm axially and 390 µm radially. The dimensions of the gas increased with $I_{trap}$ as the total GMOT population grows, and the radial-to-axial aspect ratio saturated to 2 at high trapping light intensity.

At the maximum trapping light intensity $I_{trap} \approx 1.8$ mW cm$^{-2}$ (≈0.5 $I_{sat}$), the GMOT loading rate measured using fluorescence imaging was ≈10$^7$ s$^{-1}$ with a trapping lifetime of ≈0.25 s, consistent with a background Rb partial pressure of 8×10$^{-7}$ Pa. The gas temperature measured using time-of-flight absorption imaging was (176±5) µK in the axial direction and (219±7) µK in the radial direction (FIG. 3). Here, uncertainties and tolerance as indicated were the standard uncertainty of the mean. The measured temperature was close to the $^{87}$Rb $D_2$ Doppler cooling limit of 146 µK, and the axis-dependent temperature was a consequence of the force balance set by the diffraction angle of the grating chip 134. Lower temperatures would be achievable using additional cooling stages including polarization-gradient cooling or Λ-enhanced grey molasses, for example.

Figure 4:
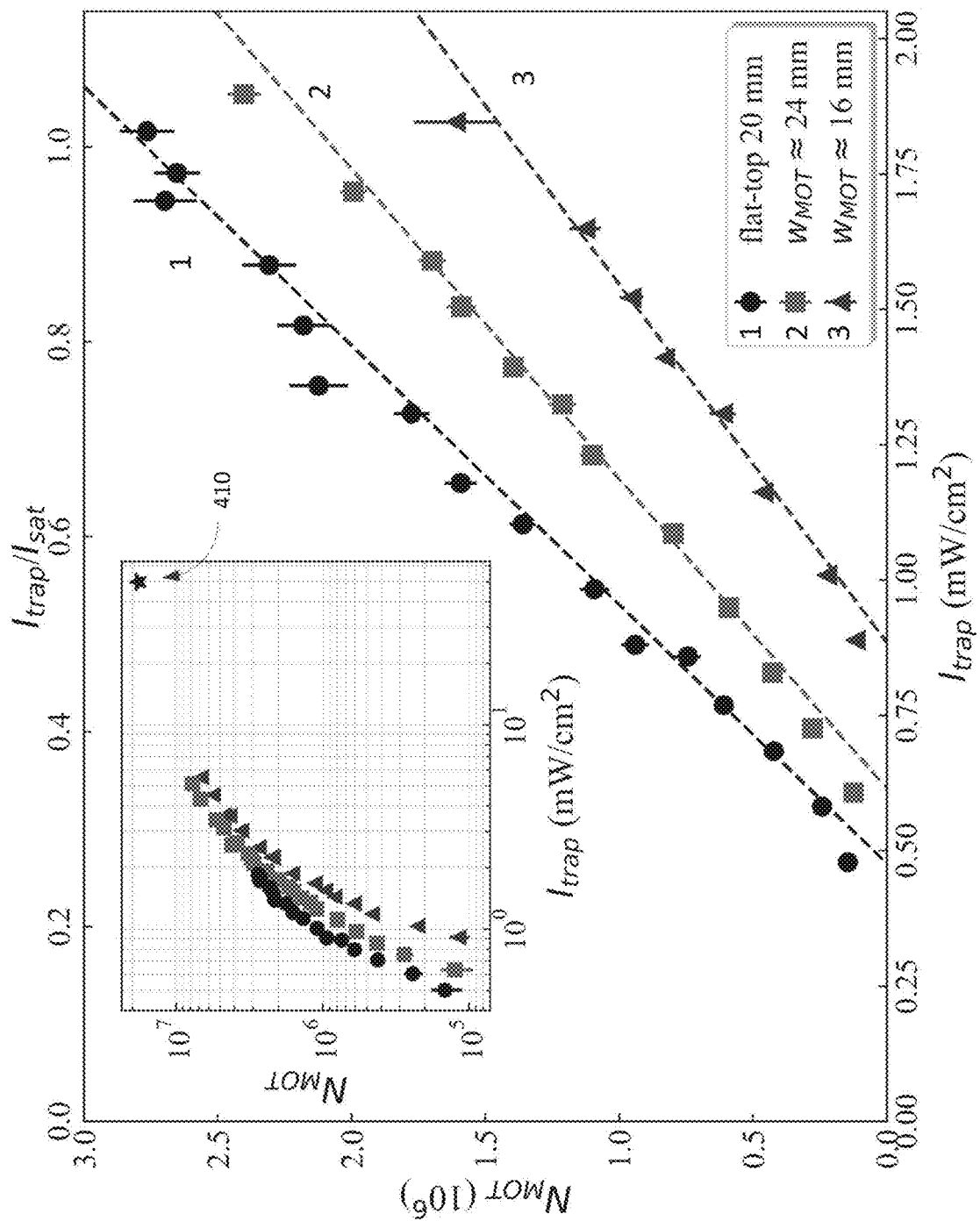
FIG. 4 illustrates the steady-state GMOT population vs. cooling light intensity. Data are shown for a 20 mm diameter, flat-top illumination of the grating chip (curve 1) as well as apodized Gaussian beam illumination with w≈24 mm (curve 2) and w≈16 mm (curve 3). Dashed lines are linear fits to the data below 2 mW cm$^{-2}$. Inset shows the same data over a larger intensity range. Extrapolated population using GMOT performance and volume scaling (borrowed from Nshii C et al., *Nature Nanotechnology* 8, 321-4, 213) is plotted for $V_{trap}$≈0.34 cm$^3$ (black star 410).

The steady-state population of the GMOT ($N_{MOT}$) was characterized at varying trapping laser intensities. It was observed that $N_{MOT}$ grew in an approximately linear fashion starting from near 0 population at $I_{trap} \approx 0.45$ mW cm$^{-2}$ and reached a population of ≈2.8×10$^6$ at $I_{trap} \approx 1.8$ mW cm$^{-2}$ (FIG. 4). The GMOT population below $I_{trap}$=0.5 mW cm$^{-2}$ was minimal due to a combination of decreased scattering forces and increased trap loss at low $I_{trap}$[41,42]. Linear growth of atom number with $I_{trap}$ was typical at low saturation of the atomic transition, and maximum steady-state GMOT populations were typically observed at $I_{trap} \gg I_{sat}$. For comparison, $N_{MOT}$ in *Nature Nanotechnology* 8, 321-4, 2013 was observed to peak at 6×10$^7$ using $I_{trap} \approx 50$ mW cm$^{-2}$ (≈14 $I_{sat}$) in $V_{trap} \approx 1$ cm$^3$. The same work demonstrated a volume scaling $N_{MOT} \sim V_{trap}^{1.2}$, predicting an equivalent maximum $N_{MOT}$ of 1.8×10$^7$ atoms in our system ($V_{trap}$=0.34 cm$^3$, star point in inset of FIG. 4). The volume-scaled population was consistent with GMOT population trend observed in current experiments.

Comparison of Operation of Proposed Embodiment(s) with that of a Conventionally-Used System.

The skilled artisan will now readily appreciate various practical advantages of use of the light delivery system configured as a combination of planar optical component based on a simple comparison between the performance of the planar-optics, flat-top illuminated GMOT discussed above with that of a traditional, conventionally-used in related art Gaussian-beam illuminated GMOT. To perform such a comparison, a bulk-optics assembly was employed to prepare collimated, circularly polarized Gaussian beams normally incident to the grating chip. Two beam waists (intensity 1/e$^2$ radii) of w≈16 mm and ≈24 mm were tested. Each Gaussian beam was delivered at normal incidence on the segmented grating chip 134 and apodized within a 20 mm diameter circle to match the boundary size of the 20 mm diameter flat-top beam 124. The concomitant beam overlap volume approximated that of the flat-top beam GMOT and enabled a fair comparison of their relative performance. GMOTs were prepared using the same nominal laser frequencies, quadrupole field gradient, and Rb partial pressure used in the flat-top illuminated GMOT experiments discussed above. The intensity of the trapping light was varied (quoted using the Gaussian beam's central intensity), and atom number and temperature measurements were made using TOF imaging. Measured temperatures and in-trap sizes were consistent with the flat-top illuminated GMOT values.

The Gaussian-illuminated GMOT population was measure to be lower than that observed with the flat-top illumination as shown in FIG. 4. For Gaussian illumination, the onset of appreciable capture was also observed at non-zero laser intensity and $N_{MOT}$ also increases approximately linearly in the low-saturation regime. Reduced capture rate for Gaussian illumination was expected due to decreased optical forces at the periphery of the capture volume and to imperfect balancing of laser-cooling forces arising from the Gaussian intensity profile. Accordingly, the onset intensity of the linear population trends also shifted to higher intensity for smaller w. Zero $N_{MOT}$ intercept values of $I_{trap} \approx 0.48$ mW cm$^{-2}$, $I_{trap} \approx 0.61$ mW cm$^{-2}$, and $I_{trap} \approx 0.88$ mW cm$^{-2}$ were observed for the flat-top beam 124, w≈24 mm and w≈16 mm Gaussian beams, respectively. The shift to capture beginning at higher central beam intensity corresponded roughly to equal intensities averaged over the trapping volume. Mean intensities over the trapping volume were calculated to be ≈110%, ≈84.7%, and ≈77% of $I_{trap}$ for the flat-top beam 124, and w=24 mm, and w=16 mm Gaussian beams, respectively. The population reduction with Gaussian illumination was most pronounced in the low saturation regime in which optical forces were linearly related to intensity. At high values of $I_{trap}$, the observed $N_{MOT}$ trends for flat-top and Gaussian illumination began to converge due to saturation of the atomic transition, as shown in inset of FIG. 4.

The use of the light beam possessing a substantially non-Gaussian (and, in particular, a substantially flat-top, uniform) profile of irradiance/intensity, generated at the MS of the embodiment of the optical diffraction apparatus discussed above, allowed for efficient use of the available optical power in illuminating the structural layer IV (the grating chip 134, as discussed). Uniform illumination in a GMOT ensured that diffracted light from the grating segments (a, b, c) could balance the forces created from the incident beam 12. In Gaussian-beam illuminated GMOTs, similar effect is typically achieved using beam waists of similar or larger dimension than the clear aperture of the grating (see, for example, "Grating chips for quantum technologies", *Scientific Reports* 7, 2017). As a result, grating-illuminating light falling outside of the grating aperture is wasted—for the w≈24 mm beam used here, ≈30% of the light strikes the ruled grating area and ≈2.5 times the optical power was required to observe the onset of trapping (accounting for the ≈71% efficiency of the MS 116). Similarly, ≈2.5 times more optical power is required for the w≈24 mm beam to trap 10$^6$ atoms relative to the flat-top beam.

The absolute power efficiency of the planar optics in generating the divergent flat-top beam from a fiber-launched Gaussian beam was about 6.4% (≈12 dB loss). Coupling light into and projecting light from the PIC was the largest source of loss at approximate 10.5 dB due to a combination of insertion loss into the PIC, waveguide loss, and scattering into the PIC substrate in the EMC. Similar devices demonstrated losses as low as 7.5 dB±0.5 dB using fiber edge coupling, and significant improvement in the mode coupler efficiencies are possible with more complex designs. The MS efficiency corresponded to 1.5 dB loss and was competitive with other high-performance designs. The specific design of the diffractive grating (in the structural layer IV) was also a source of lost optical power as, by design, only ⅓ of the incident light was diffracted toward the capture volume. Schemes using large area metasurfaces or PIC-based beam launching for all required beams provide paths to potentially higher power efficiency at the expense of greater experimental complexity.

Overall, a GMOT of Rb was demonstrated with the use of planar constituent optical devices including a PIC, MS, and grating chip to launch and manipulate light for laser cooling. Bridging the gap between the sub-micrometer-scale guided mode on the PIC and the centimeter-scale beam needed for laser cooling, a magnification of the mode area by ≈10$^{10}$, is accomplished using an on-chip EMC to launch a Gaussian mode into free space as well as a beam-shaping, polarization-dependent MS to generate an expanding, flat-top mode laser beam. The flat-top beam efficiently illuminates a grating chip to realize a four-beam GMOT with capture rates demonstrated as high as ≈10$^7$ s$^{-1}$ and gas temperatures below 200 μK. Steady-state GMOT populations were demonstrated at ≈2.8×10$^6$, consistent with published volume and intensity scaling for GMOT performance. Comparisons to equivalent Gaussian-beam-illuminated GMOTs demonstrate the power efficiency of the flat-top beam profile relative to conventional Gaussian-illumination.

The GMOT geometry and planar optics demonstrated here offer a natural pathway toward realizing calibration-free measurement platforms and other quantum devices utilizing laser-cooled atoms. The demonstrated architecture is compatible with further integration with on-chip light sources, solid-state alkali dispensers, MEMS-based vacuum hardware, and on-chip methods for imaging, and improvements in near-infrared and visible spectrum photonic integrated circuits will make these devices more power efficient and expand the scope of addressable atoms. We hope that the small physical size and robustness of planar optics GMOT designs will enable compact atomic clock designs, the emerging role of cold atoms in space interferometry for test of fundamental physics, and components required for widespread quantum networking.

The skilled person will readily appreciate that different variations of the discussed embodiments are within the scope of the present disclosure. For example, structural layer II can be alternatively configured such as to perform the functions of both the metasurface as a phase plate and the structural layer III (in which case the presence of the structural layer III is no longer required). In this case, the so-configured alternative MS chip (structural layer II) can be flip-chip bonded to PIC 104 (structural layer I) thereby resulting in one planar substantially monolithic piece that configured to emit light towards the location of the MOT with the desired divergence, directionality and polarization, resulting is a layered embodiment of the optical diffraction apparatus in which different layers are in contact with one another. Furthermore, when the structural layer IV is present and represented by the diffraction grating chip), the so stacked and integrated with one another structural layers I and II can be further bonded with/to the structural layer IV with some planar spacer in between, resulting is a related one-piece optical diffraction apparatus containing layered planar structures. Understandably, no alignment between or among the constituent layers is required in this case—the proposed arrangement of planar optical elements are designed to function with all components parallel or mechanically registered without the need for tilt-tip alignment, providing the benefit of reduced complexity for manufacturing, increased mechanical rigidity, and decreased size. In one case, the constituent structural layers of an embodiment of the light-delivery system may be necessarily parallel to one another.

References throughout this specification to "one embodiment," "an embodiment," "a related embodiment," or similar language mean that a particular feature, structure, or characteristic described in connection with the referred to "embodiment" is included in at least one embodiment of the present disclosure. Thus, appearances of the phrases "in one embodiment," "in an embodiment," and similar language throughout this specification may, but do not necessarily, all refer to the same embodiment. It is to be understood that no portion of the present disclosure, taken on its own and in possible connection with a figure, is intended to provide a complete description of all possible features of all or possible embodiments.

In addition, the following disclosure may describe features with reference to corresponding drawings, in which like numbers represent the same or similar elements wherever possible. In the drawings, the depicted structural elements are generally not to scale, and certain components are enlarged relative to the other components for purposes of emphasis and understanding. It is to be understood that no single drawing is intended to support a complete description of all features. In other words, a given drawing is generally descriptive of only some, and generally not all, features. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that embodiments may possibly be utilized without one or more of the specific features, elements, components, structures, details, or characteristics, or with the use of other methods, components, materials, and so forth. Therefore, although a particular detail of an embodiment may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment that are being discussed.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. The use of this term in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated may vary within a range defined by an experimental measurement error that is typical when using a measurement method accepted in the art for such purposes. For example, a reference to a vector or line or plane being substantially parallel to a reference line or plane is to be construed as such vector or line extending along a direction or axis that is the same as or very close to that of the reference line or plane (with angular deviations from the reference direction or axis that are considered to be practically typical in the art, for example between zero and fifteen degrees, more preferably between zero and ten degrees, even more preferably between zero and 5 degrees, and most preferably between zero and 2 degrees). As another example, the use of the term "substantially flat" in reference to the specified feature such as a spatial profile or a surface implies that such profile or surface may possess a degree of non-flatness and/or roughness that is sized and expressed as commonly understood by a skilled artisan in the specific situation at hand. For example, the terms "approximately" and about", when used in reference to a numerical value, represent a range of plus or minus 20% with respect to the specified value, more preferably plus or minus 10%, even more preferably plus or minus 5%, most preferably plus or minus 2%.

The claimed subject matter, as recited in claims appended to this disclosure, is intended to be assessed in light of the disclosure as a whole.

What is claimed is:

1. A system comprising:
    an optical diffractive apparatus having an axis, the apparatus including:
        an input structural layer containing an optical waveguide disposed substantially in a first plane transverse to the axis; and
        an output structural layer that includes a two-dimensional array of spatially-separated from one another rods of material, the array defining a second plane transverse to the axis,
        wherein the output structural layer is configured to receive a first beam of light that has a first degree of divergence and that has been formed from light channeled by the optical waveguide to propagate transversely to the axis, and to transform said first beam of light into a second beam of light having a second degree of divergence that is different from the first degree of divergence, and
        wherein the system is configured as a magneto-optical trap for an atom.

2. The system according to claim 1, wherein the optical diffractive apparatus additionally comprises:
    an auxiliary structural layer separated from the input structural layer by the output structural layer and configured to transform the second beam of light received from the output structural layer into multiple beams of light propagating in a direction of the output structural layer.

3. The system according to claim 2, wherein the auxiliary structural layer is configured to form multiple diffractive beams of equal orders of diffraction, said multiple diffractive beams originating at different respectively-corresponding locations while all overlapping at a point between the output and auxiliary structural layers.

4. The system according to claim 3, wherein the auxiliary structural layer is configured to not reflect or diffract light incident thereon along the axis.

5. The system according to claim 1, wherein the optical diffractive apparatus further comprises:
    an intermediate structural layer disposed between the input structural layer and the output structural layer and configured as a substantially plane-parallel plate of birefringent optical material.

6. The system according to claim 3, wherein at least one of the following is satisfied:
    the output structural layer is stacked upon and bonded to the input structural layer such that a light outcoupler element disposed at the input structural layer in the first plane faces the output structural layer; and
    the auxiliary structural layer is integrated with the output structural layer with a planar spacer therebetween.

7. The system according to claim 1, wherein each and every one of constituent structural layers of the optical diffraction apparatus is substantially parallel to each and every one of remaining constituent layers.

8. The system according to claim 1, wherein each and every constituent layer of the optical diffraction apparatus is a planar optical component.

9. The system according to claim 1, wherein:
the output structural layer is configured:
to accept light, outcoupled from the input structural layer transversely to an outer surface thereof, and
to transmit a portion of said light as a spatially-expanding optical beam, defined by a non-zero order of diffraction of light at the output structural layer, to a plane in which a distribution of irradiance of said spatially-expanding optical beam is substantially different from a Gaussian distribution.

10. The system according to claim 9, necessarily comprising an auxiliary structural layer separated from the input structural layer by the output structural layer,
wherein the auxiliary structural layer is configured to transform said spatially-expanding optical beam incident thereon into a plurality of return optical beams, each of which overlaps with each of the plurality of return optical beams and the spatially-expanding optical beam within the same volume of space.

11. A method for controlling parameters of a beam of light, the method comprising:
using the system according to claim 1; and
at the output structural layer, transforming a first beam of light, that has been outcoupled from the input structural layer in a first direction at a non-zero angle to a surface of the input structural layer and received by the output structural layer,
to change a degree of spatial divergence, a direction of propagation, and a state of polarization of a first portion of said first beam of light while relaying a second portion of said first beam of light in the first direction.

12. The method according to claim 11, wherein the method comprises one or more of the following:
propagating the first portion of the first beam of light through a substantially optically uniform medium to define a cross-section, of said first portion, that has a substantially non-Gaussian profile of irradiance;
transmitting the first beam of light through an optical retarder along an axis substantially coinciding with the first direction; and
impinging light of the first beam of light onto a birefringent planar metasurface at an angle substantially equal to the non-zero angle.

13. The method according to claim 11, further comprising:
receiving the first portion at an auxiliary structural layer of the system that is separated from the input structural layer by the output structural layer such that a cross-section of the first portion is substantially congruent with an active area of the auxiliary structural layer; and
transforming light from said first portion to define multiple beams of light propagating in a direction of the output structural layer.

14. An optical apparatus having an axis and comprising:
a planar optical waveguide component having an outer surface;
a first optical system configured:
to accept a first beam of light, outcoupled from the planar optical waveguide component transversely to the outer surface, and
to transmit a portion of light of the first beam of light as a spatially-expanding optical beam, defined by a non-zero order of diffraction of light at the first optical system, to a plane in which a distribution of irradiance of said spatially-expanding optical beam is substantially different from a Gaussian distribution; and
a second optical system disposed at the plane and configured to transform said spatially-expanding optical beam incident thereon into a plurality of return optical beams, each of which overlaps with each of the plurality of return optical beams and the spatially-expanding optical beam within the same volume of space,
wherein the optical apparatus is configured as a part of a magneto-optical trap for an atom.

15. The optical apparatus according to claim 14, configured to form the spatially-expanding optical beam such that a cross-sectional area of the spatially-expanding optical beam, measured at the plane, exceeds a cross-section of the first beam of light at the planar optical waveguide component by at least a coefficient of $10^4$, and wherein said distribution of irradiance is a substantially spatially-uniform distribution.

16. The optical apparatus according to claim 14, wherein the first optical system includes at least one of the following:
a birefringent substantially planar metasurface that is dimensioned to transform light incident thereon into light having a circular polarization and a phase profile component corresponding to a phase shift that is introduced by a lens with a negative optical power into light propagating through such lens;
and
an optical retarder, disposed between the birefringent substantially planar metasurface and the planar waveguide component, wherein the birefringent substantially planar metasurface is configured to change a first state of polarization of the light incident thereon, which light has been outcoupled from the planar optical waveguide component and that has traversed the optical retarder, to a second state of polarization that is orthogonal to the first state of polarization.

17. The optical apparatus according to claim 16, wherein the birefringent substantially planar metasurface includes only surface features each of which is a half-wave optical retarder at a wavelength of the first beam of light.

18. The optical apparatus according to claim 14,
wherein the planar optical waveguide component is configured to outcouple light propagating therein as the first beam of light directed transversely to a normal drawn to the outer surface, and
wherein the first optical system includes a substantially planar metasurface configured to transmit said light therethrough to form said spatially-expanding optical beam propagating at a non-zero angle with respect to said normal.

19. A method for controlling parameters of a beam of light, the method comprising:
during a process of forming a magneto-optical trap (MOT) for an atom using a first beam of light outcoupled from a planar photonic integrated circuit (PIC) element:
transforming the first beam of light by having the first beam of light interact with a first optical system to produce a second beam of light having a substantially non-Gaussian profile at a pre-defined distance from the PIC element
while, at once,
defining a cross-sectional area of the second beam at the pre-defined distance to be at least $10^4$ times larger than that of the first beam of light at the PIC element, wherein the pre-defined distance is within a range from about 1 mm to about 200 mm.

20. The method according to claim 19, further comprising:
spatially separating, at the first optical system, a zeroth order of diffraction of the first beam from a non-zeroth order of diffraction of the first beam, and
delivering light from the non-zeroth order of diffraction as said second beam of light to a second optical system, disposed at said pre-defined distance, to form the MOT.

* * * * *